United States Patent
Sinha et al.

(10) Patent No.: US 9,167,278 B2
(45) Date of Patent: Oct. 20, 2015

(54) METHOD AND SYSTEM FOR AUTOMATIC CONTENT RECOGNITION (ACR) BASED BROADCAST SYNCHRONIZATION

(71) Applicant: Turner Broadcasting System, Inc., Atlanta, GA (US)

(72) Inventors: Nishith Kumar Sinha, Mableton, GA (US); Matthew Paul Giles, Marietta, GA (US); Donald Jude Loheide, Mableton, GA (US)

(73) Assignee: Turner Broadcasting System, Inc., Atlanta, GA (US)

( * ) Notice: Subject to any disclaimer, the term of this patent is extended or adjusted under 35 U.S.C. 154(b) by 0 days.

(21) Appl. No.: 14/141,972

(22) Filed: Dec. 27, 2013

(65) Prior Publication Data

US 2014/0282658 A1 Sep. 18, 2014

Related U.S. Application Data

(60) Provisional application No. 61/798,439, filed on Mar. 15, 2013.

(51) Int. Cl.
| | |
|---|---|
| *H04N 5/445* | (2011.01) |
| *G06F 3/00* | (2006.01) |
| *G06F 13/00* | (2006.01) |

(Continued)

(52) U.S. Cl.
CPC ......... *H04N 21/23424* (2013.01); *H04H 20/93* (2013.01); *H04H 60/37* (2013.01); *H04H 60/40* (2013.01); *H04H 60/82* (2013.01); *H04N 21/234* (2013.01); *H04N 21/23418* (2013.01); *H04N 21/4122* (2013.01); *H04N 21/44008* (2013.01); *H04N 21/6125* (2013.01); *H04N 21/6175* (2013.01); *H04N 21/64322* (2013.01)

(58) Field of Classification Search
CPC .................. H04N 21/23418; H04N 21/44008; H04N 21/234
USPC ...................................................... 725/32–35
See application file for complete search history.

(56) References Cited

U.S. PATENT DOCUMENTS

| | | | |
|---|---|---|---|
| 2002/0032906 | A1 | 3/2002 | Grossman |
| 2002/0069100 | A1 | 6/2002 | Arberman |

(Continued)

FOREIGN PATENT DOCUMENTS

| | | |
|---|---|---|
| WO | WO 95/17746 A1 | 6/1995 |
| WO | WO 02/37316 A2 | 5/2002 |
| WO | WO 03/067459 A1 | 8/2003 |

*Primary Examiner* — Mark D Featherstone
*Assistant Examiner* — Akshay Doshi
(74) *Attorney, Agent, or Firm* — Hopeton S. Walker; Loza & Loza, LLP

(57) ABSTRACT

An automatic content recognition (ACR) enabled display communication device that is operable to receive and consume content from a linear feed and a corresponding IP-based feed. The linear feed and the IP-based feed includes one or more content identifiers that identify similar content within the linear feed and the IP-based feed and also includes one or more corresponding automatic content recognition triggers. The ACR-enabled display communication device determines a first content identifier that is associated with a first content in the linear feed that is being consumed and requests IP segments in the IP-based feed that corresponds to the determined first content identifier and switches from consuming content in the linear feed to consuming content in the requested IP segments. The ACR-enabled display communication device stores the determined first content identifier and receives the requested IP segments from a remote server.

30 Claims, 8 Drawing Sheets

(51) Int. Cl.
  *H04N 7/173* (2011.01)
  *H04N 21/234* (2011.01)
  *H04H 60/40* (2008.01)
  *H04N 21/44* (2011.01)
  *H04N 21/61* (2011.01)
  *H04N 21/643* (2011.01)
  *H04H 60/37* (2008.01)
  *H04N 21/41* (2011.01)
  *H04H 20/93* (2008.01)
  *H04H 60/82* (2008.01)

(56) References Cited

U.S. PATENT DOCUMENTS

| | | |
|---|---|---|
| 2002/0073419 A1 | 6/2002 | Yen et al. |
| 2002/0078441 A1 | 6/2002 | Drake et al. |
| 2002/0083060 A1 | 6/2002 | Wang et al. |
| 2002/0120925 A1 | 8/2002 | Logan |
| 2002/0133817 A1 | 9/2002 | Markel |
| 2002/0178447 A1 | 11/2002 | Plotnick et al. |
| 2003/0002638 A1 | 1/2003 | Kaars |
| 2003/0035075 A1 | 2/2003 | Butler et al. |
| 2003/0055699 A1 | 3/2003 | O'Connor |
| 2003/0056101 A1 | 3/2003 | Epstein |
| 2003/0101451 A1 | 5/2003 | Bentolila et al. |
| 2003/0149975 A1 | 8/2003 | Eldering et al. |
| 2003/0154475 A1 | 8/2003 | Rodriguez et al. |
| 2003/0172381 A1 | 9/2003 | Janevski |
| 2004/0003397 A1 | 1/2004 | Boston et al. |
| 2004/0031046 A1 | 2/2004 | Weinblatt et al. |
| 2004/0034874 A1 | 2/2004 | Hord et al. |
| 2008/0244640 A1* | 10/2008 | Belleguie ............ 725/35 |
| 2009/0327894 A1* | 12/2009 | Rakib et al. ............ 715/719 |
| 2010/0150525 A1* | 6/2010 | Walker ............ 386/69 |
| 2011/0085077 A1* | 4/2011 | Yamashita ............ 348/384.1 |
| 2012/0042349 A1* | 2/2012 | Ng et al. ............ 725/109 |
| 2014/0164994 A1* | 6/2014 | Myslinski ............ 715/808 |

\* cited by examiner

METHOD AND SYSTEM FOR AUTOMATIC CONTENT RECOGNITION (ACR) BASED BROADCAST SYNCHRONIZATION

CROSS-REFERENCE TO RELATED APPLICATIONS/INCORPORATION BY REFERENCE

This application makes reference to, claims priority to, and claims the benefit of U.S. Application Ser. No. 61/798,439, which was filed on Mar. 15, 2013.

This application also makes reference to:
U.S. application Ser. No. 13/730,352, which was filed on Dec. 28, 2012;
U.S. application Ser. No. 14/141,931, which was filed on Dec. 27, 2014;
U.S. application Ser. No. 14/141,995, which was filed on Dec. 27, 2014;
U.S. application Ser. No. 14/142,022, which was filed on Dec. 27, 2014; and
U.S. application Ser. No. 14/142,041, which was filed on Dec. 27, 2014;
U.S. application Ser. No. 13/730,352, filed Dec. 28, 2012;
U.S. application Ser. No. 13/730,459, filed Dec. 28, 2012;
U.S. application Ser. No. 13/730,495, filed Dec. 28, 2012;
U.S. application Ser. No. 13/730,530, filed Dec. 28, 2012;
U.S. application Ser. No. 13/730,754, filed Dec. 28, 2012;
U.S. application Ser. No. 13/730,559, filed Dec. 28, 2012;
U.S. application Ser. No. 13/730,579, filed Dec. 28, 2012;
U.S. application Ser. No. 13/730,593, filed Dec. 28, 2012;
U.S. application Ser. No. 13/730,759, filed Dec. 28, 2012;
U.S. application Ser. No. 13/730,627, filed Dec. 28, 2012;
U.S. application Ser. No. 13/730,644, filed Dec. 28, 2012;
U.S. application Ser. No. 13/730,656, filed Dec. 28, 2012;
U.S. application Ser. No. 13/730,670, filed Dec. 28, 2012;
U.S. application Ser. No. 13/730,691, filed Dec. 28, 2012;
U.S. application Ser. No. 13/730,702, filed Dec. 28, 2012;
U.S. application Ser. No. 13/730,718, filed Dec. 28, 2012; and
U.S. application Ser. No. 13/730,734, filed Dec. 28, 2012.

Each of the above referenced application is hereby incorporated herein by reference in its entirety.

FIELD OF THE DISCLOSURE

Certain embodiments of the disclosure relate to communication systems. More specifically, certain embodiments of the disclosure relate to a method and system for automatic content recognition based synchronization.

BACKGROUND OF THE DISCLOSURE

A significant portion of some businesses' revenue is derived from advertisements. The manner in which these advertisements are presented to viewer and the way these viewers interact with and/or perceive the presented advertisements is very important to the success of these businesses.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

A system and/or method is provided for automatic content recognition based synchronization, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE DISCLOSURE

Certain embodiments of the disclosure may be found in a method and system for automatic content recognition (ACR) based synchronization. An automatic content recognition enabled display communication device is operable to receive and consume content from a linear feed and a corresponding Internet Protocol (IP) based feed. The linear feed and the IP-based feed may comprise one or more content identifiers that identify similar content within the linear feed and the IP-based feed and may also include one or more corresponding automatic content recognition triggers. The automatic content recognition enabled display communication device is operable to determine a first content identifier that is associated with a first content in the linear feed that is being consumed by the automatic content recognition enabled display communication device. The automatic content recognition enabled display communication device is operable to request IP segments in the IP-based feed that corresponds to the determined first content identifier and switch from consuming content in the linear feed to consuming content in the requested IP segments. The automatic content recognition enabled display communication device is operable to store the determined first content identifier. The automatic content recognition enabled display communication device is operable to receive the requested IP segments from a remote server.

The automatic content recognition enabled display communication device may also be operable to determine the first content identifier in response to a demand to initiate consumption from the IP-based feed. In some embodiments of the disclosure, the demand may occur after completion of consumption of secondary content on a second screen communication device and there is a need to resume consumption of content from a point corresponding to the first content identifier. In some embodiments of the disclosure, the demand may occur when a request to share content being consumed is initiated. The switch from consuming content in the linear feed to consuming content in the requested IP segments is transparent to a viewer of the automatic content recognition enabled display communication device. The automatic content recognition enabled display communication device may also be operable to share one or more portions of the consumed content in the requested IP segments. The one or more portions of the consumed content in the requested IP segments may be shared via one or more social networking postings. The automatic content recognition enabled display communication device may be operable to acquire from one or more profiles and/or preferences, information that may be utilized for handling the one or more social networking postings.

Figure 1:
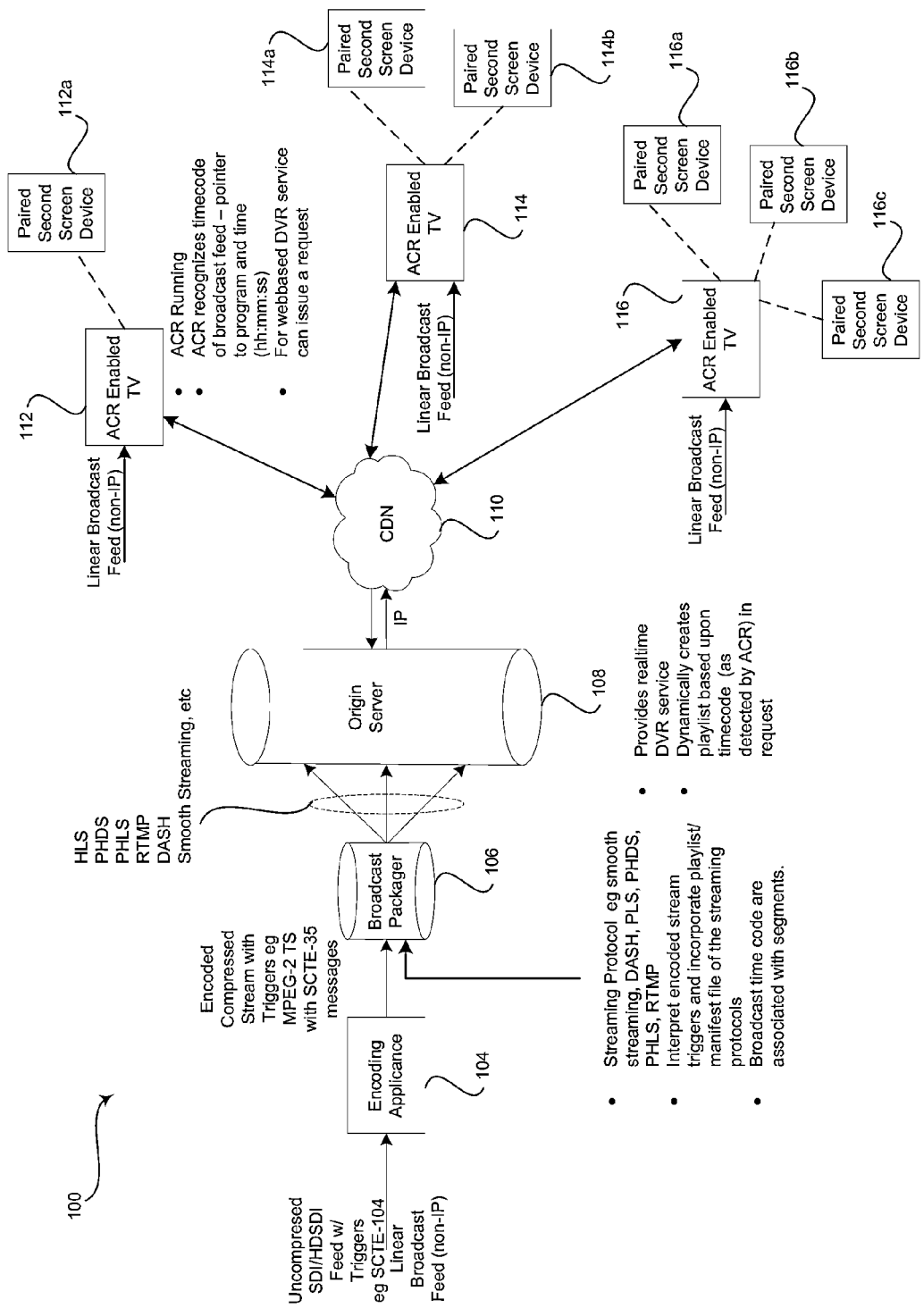
FIG. 1 is a diagram that illustrates an exemplary system for automatic content recognition (ACR) integration for smart-TVs and mobile devices, in accordance with an exemplary embodiment of the disclosure.

FIG. 1 is a diagram that illustrates an exemplary system for automatic content recognition integration for smartTVs and mobile communication devices, in accordance with an exemplary embodiment of the disclosure. Referring to FIG. 1, there is shown a exemplary system for automatic content recognition integration for smartTVs and mobile communication devices 100 comprising an encoding appliance 104, a broadcast packager 106, an origin server 108, a content delivery network (CDN) 110, a plurality of ACR-enabled smartTVs 112, 114, 116 and a plurality of paired second screen communication devices 112a, 114a, 114b, 116a, 116b, 116c.

The encoding appliance 104 may comprise suitable logic, circuitry, interfaces and/or code that may be operable to encode a received feed into one or more encoded formats and accordingly generate one or more corresponding output encoded feeds. The encoding appliance 104 may be operable to receive an uncompressed (high definition) serial digital interface (HDSDI) protocol feed, which may comprise embedded metadata triggers that can include frame accurate declarations of advertisement and program time boundaries. The uncompressed (high definition) serial digital interface (HDSDI) protocol feed comprises a linear broadcast feed and as such, is a non-Internet Protocol (non-IP) feed or stream. In an exemplary embodiment of the disclosure, the serial digital interface (SDI/HDSDI) protocol feed may comprise a SCTE-104 SDI protocol feed. SCTE-104 is a standardized metadata insertion specification that may be utilized to declare digital insertion points of program and advertisement content in high definition (HD) SDI streams. SCTE-104 enables the insertion of advertisements (commercials) and custom content such as the ACR-based triggers and assets in the HD SDI broadcast stream. The encoding appliance 104 may be operable to encode the received linear broadcast feed and generate an encoded compressed stream with content triggers translated from the broadcast SCTE-104 messages. In an exemplary embodiment of the disclosure, the encoding appliance 104 may be operable to encode the received linear broadcast feed and generate an MPEG-2 transport stream (TS) with SCTE-35 messages. SCTE-35 is a standardized advertisement insertion specification that is utilized to define, for example, cue and insertion points in MPEG-2 transport streams.

The broadcast packager 106 may comprise suitable logic, circuitry, interfaces and/or code that may be operable to receive the encoded compressed stream with the SCTE-35 triggers and packages the content in one or more IP based web delivery formats. In an embodiment of the disclosure, the broadcast packager 106 may be operable to package at least a portion of the encoded compressed stream with the SCTE-35 triggers into streaming or segmented streaming protocol formats. Exemplary streaming or segmented streaming protocol formats may comprise, for example, hypertext transport protocol (HTTP) Live Streaming (HLS) format, Microsoft smooth streaming, Dynamic Adaptive Streaming over HTTP (DASH) (also referred to as MPEG-DASH), Protected HTTP Dynamic Streaming (PHDS), Protected HTTP Live Streaming (PHLS), and real time messaging protocol (RTMP). The broadcast packager 106 may be operable to interpret the encoded stream triggers and incorporate playlists and/or manifests file for the streaming protocols. The broadcast packager 106 may also be operable to handle the processing and insertion of broadcast time codes as obtained from an internal system clock or external NTP (Network Time Protocol) based source into the packaged content for the various broadcast stream formats. In the case of segmented streaming protocols (e.g., HLS, DASH, Microsoft Smooth Streaming, and HDS/pHDS) the packager may use broadcast timecodes as part of the naming convention of the stream 'chunks' so as to enable DVR playback via dynamic playlist creation. The packaged content for the various broadcast stream formats generated by the broadcast packager 106 may comprise one or more IP-based digital streams.

The origin server 108 may comprise suitable logic, circuitry, interfaces and/or code that may be operable to store the packaged content for the various IP-based broadcast stream formats. The origin server 108 may also be operable to post assets (e.g. IP-based version of the asset with corresponding metadata declarations in the manifest files) to one or more servers or storage devices within the content delivery network 110. The assets may comprise, for example, graphics, banners, overlays, text, audio, video and so on, which may be utilized by the ACR-enabled smartTVs 112, 114, 116. As noted in the diagram, the origin server 108 may also be operable to provide a real time DVR service via dynamic playlist creation based upon start and stop timecodes in the request. This may also be provided by the content delivery network 110.

The encoding appliance 104 may comprise suitable logic, circuitry, interfaces and/or code that may be operable to encode a received feed into one or more encoded formats and accordingly generate one or more corresponding output encoded feeds. The encoding appliance 104 may be operable to receive an uncompressed (high definition) serial digital interface (HDSDI) protocol feed, which may comprise embedded metadata triggers that can include frame accurate declarations of advertisement and program time boundaries. The uncompressed (high definition) serial digital interface (HDSDI) protocol feed comprises a linear broadcast feed and as such, is a non-Internet Protocol (non-IP) feed or stream. In an exemplary embodiment of the disclosure, the serial digital interface (SDI/HDSDI) protocol feed may comprise a SCTE- 104 SDI protocol feed. SCTE-104 is a standardized metadata insertion specification that may be utilized to declare digital insertion points of program and advertisement content in high definition (HD) SDI streams. SCTE-104 enables the insertion of advertisements (commercials) and custom content such as the ACR-based triggers and assets in the HD SDI broadcast stream. The encoding appliance 104 may be operable to encode the received linear broadcast feed and generate an encoded compressed stream with content triggers translated from the broadcast SCTE-104 messages. In an exemplary embodiment of the disclosure, the encoding appliance 104 may be operable to encode the received linear broadcast feed and generate an MPEG-2 transport stream (TS) with SCTE-35 messages. SCTE-35 is a standardized advertisement insertion specification that is utilized to define, for example, cue and insertion points in MPEG-2 transport streams.

The broadcast packager 106 may comprise suitable logic, circuitry, interfaces and/or code that may be operable to receive the encoded compressed stream with the SCTE-35 triggers and packages the content in one or more IP based web delivery formats. In an embodiment of the disclosure, the broadcast packager 106 may be operable to package at least a portion of the encoded compressed stream with the SCTE-35 triggers into streaming or segmented streaming protocol formats. Exemplary streaming or segmented streaming protocol formats may comprise, for example, hypertext transport protocol (HTTP) Live Streaming (HLS) format, Microsoft smooth streaming, Dynamic Adaptive Streaming over HTTP (DASH) (also referred to as MPEG-DASH), Protected HTTP Dynamic Streaming (PHDS), Protected HTTP Live Streaming (PHLS), and real time messaging protocol (RTMP). The broadcast packager 106 may be operable to interpret the encoded stream triggers and incorporate playlists and/or manifests file for the streaming protocols. The broadcast packager 106 may also be operable to handle the processing and insertion of broadcast time codes as obtained from an internal system clock or external NTP (Network Time Protocol) based source into the packaged content for the various broadcast stream formats. In the case of segmented streaming protocols (e.g., HLS, DASH, Microsoft Smooth Streaming, and HDS/pHDS) the packager may use broadcast timecodes as part of the naming convention of the stream 'chunks' so as to enable DVR playback via dynamic playlist creation. The packaged content for the various broadcast stream formats generated by the broadcast packager 106 may comprise one or more IP-based digital streams.

The origin server 108 may comprise suitable logic, circuitry, interfaces and/or code that may be operable to store the packaged content for the various IP-based broadcast stream formats. The origin server 108 may also be operable to post assets (e.g. IP-based version of the asset with corresponding metadata declarations in the manifest files) to one or more servers or storage devices within the content delivery network 110. The assets may comprise, for example, graphics, banners, overlays, text, audio, video and so on, which may be utilized by the ACR-enabled smartTVs 112, 114, 116. As noted in the diagram, the origin server 108 may also be operable to provide a real time DVR service via dynamic playlist creation based upon start and stop timecodes in the request. This may also be provided by the content delivery network 110.

Figure 2:
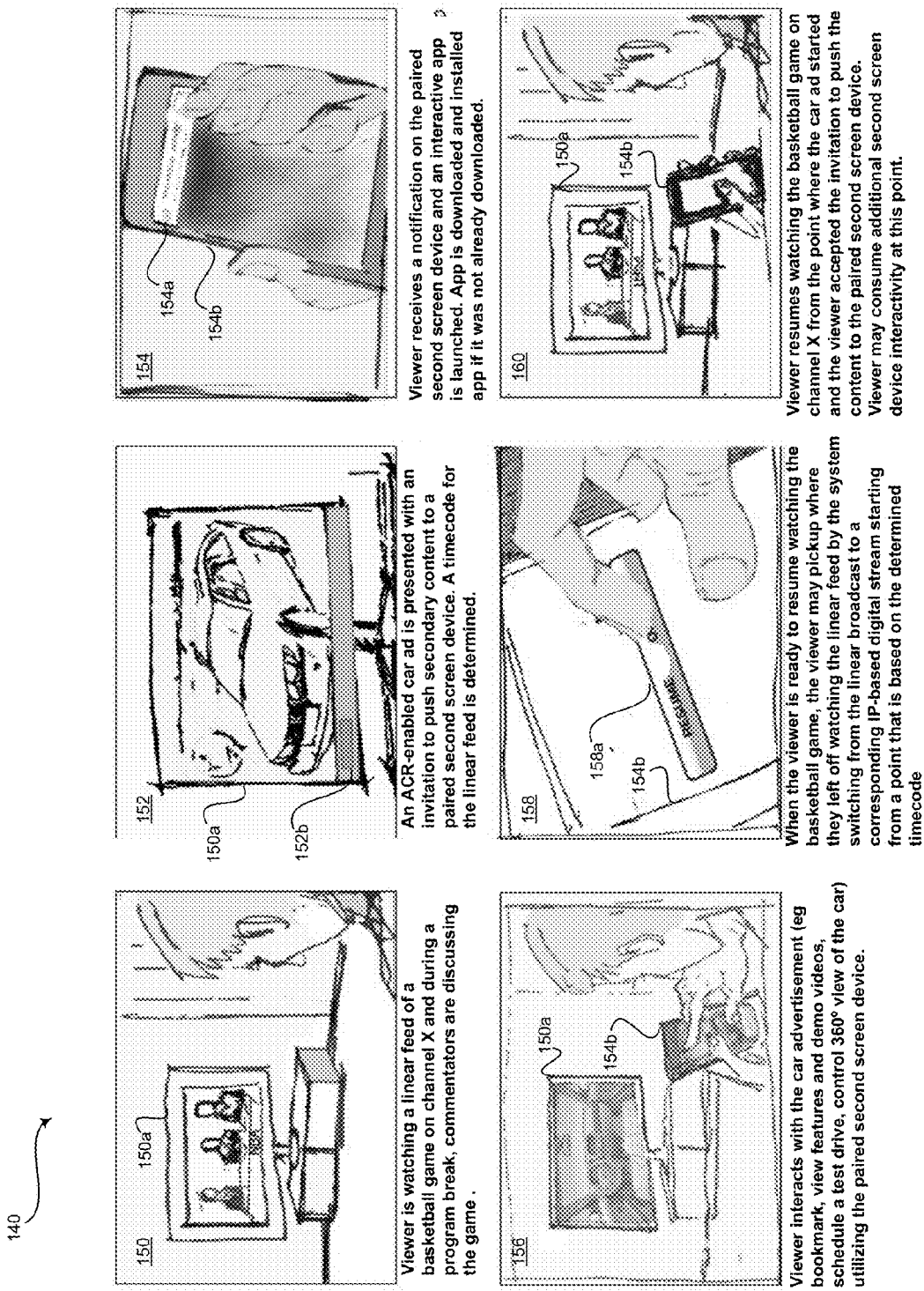
FIG. 2 is a flow diagram that illustrates an exemplary scenario for user interaction in a system for automatic content recognition integration for an ACR-enabled smartTV and a mobile communication device, in accordance with an exemplary embodiment of the disclosure.

FIG. 2 is a flow diagram that illustrates an exemplary scenario for user interaction in a system for automatic content recognition integration for an ACR-enabled smartTV and a mobile communication device, in accordance with an exemplary embodiment of the disclosure. Referring to FIG. 2, there is shown flow diagram 140 comprising a plurality of views, namely, views 150, 152, 154, 156, 158 and 160. FIG. 2 also shows an ACR-enabled smartTV 150a, a paired second screen communication device 154b, an ACR banner 152b and a resume button or icon 158a.

In view 150, a viewer is watching a linear feed of a basketball game on channel X and during a break (e.g. end of half, timeout, etc.) in the game, commentators are illustrated discussing the basket game. In view 150, the viewer is watching the basketball game on the ACR-enabled smartTV 150a. The linear feed is a live broadcast feed as delivered by the MVPD system. The MVPD system is described with respect to, for example, FIG. 3.

In view 152, an ACR-enabled car advertisement (ad) is presented on the ACR-enabled smartTV 150a with an invitation to push secondary content to a paired second screen communication device. The invitation may be presented by the ACR banner 152b. A timecode for the linear feed is determined.

In view 154, the viewer receives a notification 154a on the paired second screen communication device 154b and an interactive application is launched on the paired second screen communication device 154b. In instances where the interactive application was not previously downloaded and installed in the paired second screen communication device 154b, the interactive application may be downloaded and installed on the paired second screen communication device 154b.

In view 156, the viewer interacts with the car advertisement utilizing the interactive application that was launched in the paired second screen communication device 154b. The interaction with the car advertisement, which is occurring on the paired second screen communication device 154b, may concurrently be presented on the ACR-enabled smartTV 150a. In some instances, the interaction with the car advertisement, which is occurring on the paired second screen communication device 154b, is displayed only on the paired second screen communication device 154b. The interaction may comprise, for example, saving a bookmark, selecting and/or viewing features such as model, color, option package, and trim, viewing pertinent demo videos, scheduling a test drive and/or controlling a 360° view of the car in the car advertisement utilizing the paired second screen communication device 154b.

In view 158, when the viewer is ready to resume watching the basketball game on the ACR-enabled smartTV 150a, the viewer may pickup where they left off watching the linear feed by the system switching from the linear broadcast to a corresponding IP-based digital stream. The viewer may activate the resume button or icon 158a in order to initiate the switch from the linear broadcast to the corresponding IP-based digital stream.

In view 160, the viewer resumes watching the basketball game on channel X from the point where the car advertisement started and the viewer accepted the invitation to push the content to the paired second screen communication device. The viewer may consume additional second screen communication device interactivity at this point.

The interactive application may generate and present the viewer with various options and tools that may enable the viewer to customize and view various features of the car, interact with the car, playing a video of the car on the paired second screen communication device and/or concurrently on the ACR-enabled TV. In this regard, in one aspect of the disclosure, the user of the paired second screen communication device may select an option to interact with the car advertisement on the paired second screen communication device but the interaction may not be replicated on the screen of the ACR-enabled TV. In another aspect of the disclosure, the user of the paired second screen communication device may select an option to interact with the car advertisement on the paired second screen communication device and the interaction may be replicated or incorporate an on screen component (e.g. a game that permits shooting baskets from the secondary device but the hoop is on the smartTV) on the ACR-enabled TV. In other words, the interaction on the paired second screen communication device is concurrently displayed OR part of an on screen experience on the ACR-enabled TV.

Various embodiments of the disclosure may comprise ACR-based broadcast synchronization, which may enable an automatic content recognition enabled smart television, for example, the ACR-enabled smartTV 114, to switch between a linear broadcast feed and an IP-based stream or feed. The ACR-based broadcast synchronization utilizes an identifier, for example, a timecode linear broadcast feed and/or the IP-based stream or feed, to enable a viewer to resume consuming content at approximately the same location or at a desired location when a switch occurs from a linear broadcast feed to a non-linear or IP-based stream or feed and vice-versa. Other identifiers may be located in or placed in the linear broadcast feed and/or the IP-based stream or feed to enable the synchronization.

In an exemplary embodiment of the disclosure, a viewer may be watching a linear feed (i.e., non-IP broadcast feed) such as news on an ACR-enabled smart TV 114. A car advertisement is aired on the ACR-enabled smartTV and an ACR event is triggered, which causes a notification banner to be displayed on the ACR-enabled smart TV 114. The notification banner notifies and/or invites the viewer to interact with secondary content on a paired second screen communication device 114a. The paired second screen communication device 114a may be the viewer's Smartphone or Tablet. A timecode that is associated with the linear feed may be determined and stored by the ACR-enabled smart TV 114. The viewer may interact with the secondary content on the paired second screen communication device 114a. When the viewer is done interacting on the second screen communication device, the viewer may want to return to watching the linear feed from the point where the viewer switched to interacting with the secondary content on the second screen communication device 114a. Accordingly, the ACR-enabled smartTV 114 may retrieve the stored timecode and request that the origin server 108 deliver an IP-based stream or feed comprising IP segments starting from a point corresponding to the retrieved timecode.

The ACR-enabled smartTV 114 may be operable to switch from consuming the linear broadcast content to consuming the requested IP segments in the IP-based stream or feed starting from the point corresponding to the retrieved timecode. In this regard, the playback or consumption of the linear broadcast content and the IP-based stream or feed is synchronized. The switch from the linear broadcast feed to the corresponding IP-based stream or feed may be seamless and transparent to the viewer. In accordance with various embodiments of the disclosure, the ACR-enabled smartTV 114 may be operable to cache and/or store some of the content that may be received via the linear feed or the IP-based feed or stream. The ACR-enabled smart TV 114 may comprise a digital video recording (DVR) capability. The ACR-enabled smartTV 114 may be operable to retrieve the cached or stored content for consumption as needed. If more content is required than is cached or stored, the ACR-enabled smartTV 114 may be operable to request corresponding IP segments from the origin server 108.

In an exemplary embodiment of the disclosure, a viewer may be consuming content for a linear feed on the ACR-enabled smartTV 114 and decides to share the content being viewed. The viewer may initiate a request to share the content. At about the time that the viewer initiates a request to share the content, the current broadcast timecode for the corresponding feed that is being consumed may be captured. Assume the current captured broadcast timecode is tn. The user desires to share content for broadcast timecode tn and the preceding 30 minutes, the latter of when may be represented as broadcast timecode t(n−30). Hence, the user desires to share 30 minutes of content which started at broadcast timecode t(n−30) and ended at broadcast timecode tn. This may be represented as (t(n−30),tn). An ACR engine in the ACR-enabled smartTV 114 may be operable to send a request to the origin server 108 requesting delivery of the corresponding IP segments in the IP-based stream or feed, which started at t(n−30) and ended at tn i.e., IP broadcast content with broadcast timecode ((t(n−30),tn)). In other words, the ACR engine in the ACR-enabled smartTV 114 sends a request to the origin server for IP broadcast feed content, which has a broadcast timecode of tn and includes the previous 30 minutes (t(n−30). A similar mechanism may be utilized to define and request corresponding IP segments in an IP-based stream or feed over any period of time.

The origin server 108 may be operable to serve the requested IP segments to the ACR engine in the ACR-enabled smartTV 114. The ACR engine in the ACR-enabled smartTV 114 may be operable to coordinate with, for example, a host processor of the ACR-enabled TV 114 to share the requested IP segments with one or more designated locations, which may be specified by the viewer of the ACR-enabled smartTV 114. For example, the shared content may be posted to social networks such as Twitter, Google+ and/or Facebook and to websites and/or blogs. The viewer may have one or more preferences and/or profiles or may manually specify to whom and/or where content corresponding to the requested IP segments should be shared with.

Figure 3:
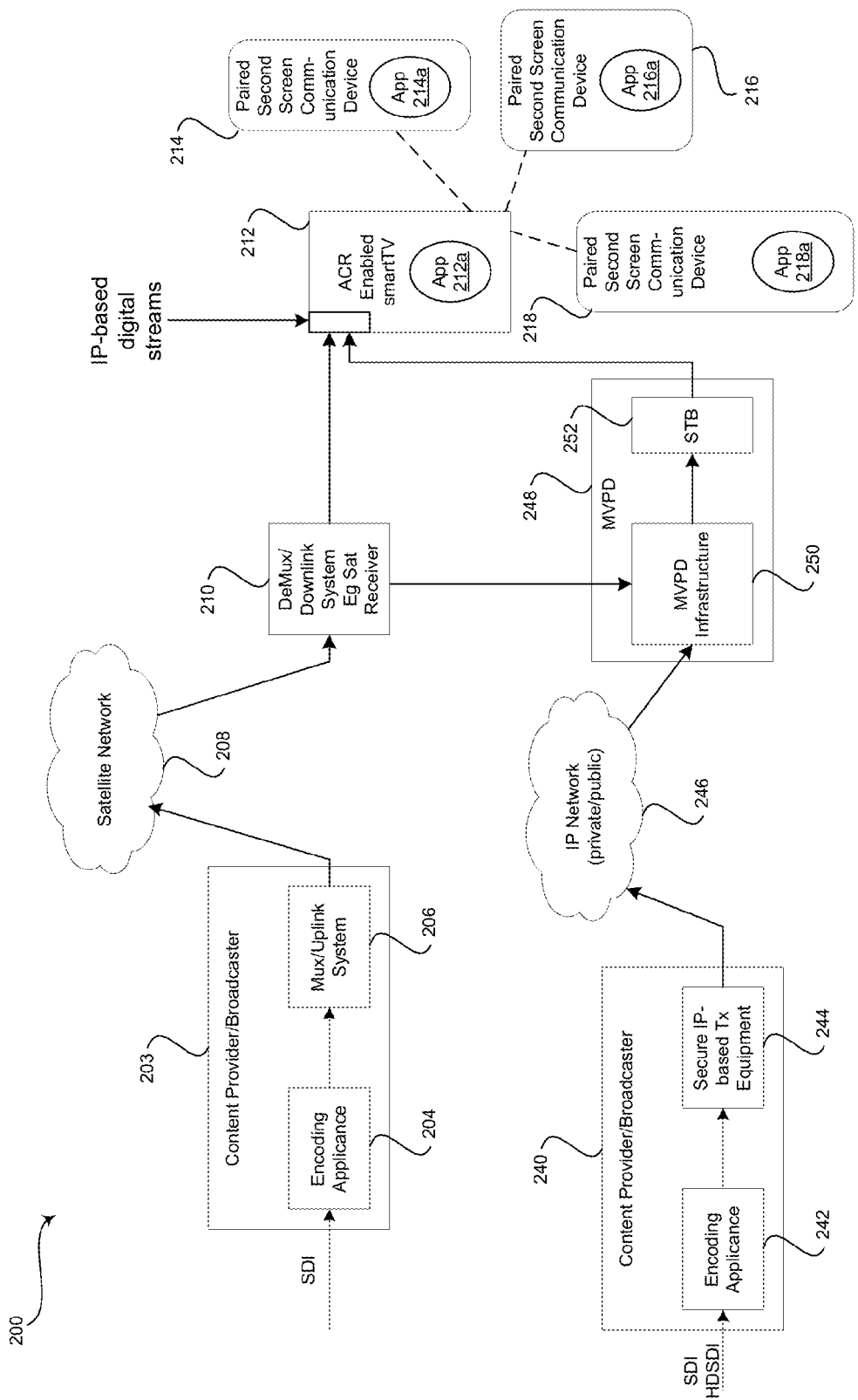
FIG. 3 is a diagram that illustrates an exemplary system for automatic content recognition (ACR) integration for smart-TVs and mobile communication devices, which utilizes a plurality of broadcast feeds, in accordance with an exemplary embodiment of the disclosure.

FIG. 3 is a diagram that illustrates an exemplary system for automatic content recognition (ACR) integration for smartTVs and mobile communication devices, which utilizes a plurality of broadcast feeds, in accordance with an exemplary embodiment of the disclosure. Referring to FIG. 3, there is shown a system for automatic content recognition (ACR) integration for smartTVs and mobile communication devices 200, which utilizes a satellite broadcast feed. The system for automatic content recognition (ACR) integration for smartTVs and mobile communication devices 200 comprises a content provider/broadcaster 203, a satellite network 208, a content provider/broadcaster 240, and IP network 246, a multichannel video programming distributor (MVPD) 248, an ACR-enabled smartTV 212, and a plurality of paired second screen communication devices 214, 216, 218. The content provider/broadcaster 203 comprises an encoding appliance 204, and a multiplexer (mux) and uplink system 206. The content provider/broadcaster 240 comprises an encoding appliance 242, and secure IP-based transmission equipment 244. The MVPD 240 may comprise an MVPD infrastructure 250 and a set-top box (STB) 252. The system for automatic content recognition (ACR) integration for smartTVs and mobile communication devices 200, which utilizes a satellite broadcast feed is operable to deliver a linear broadcast feed to one or more ACR-enabled smartTVs such as the ACR-enabled smartTV 212.

The content provider/broadcaster 203 may be operable to generate content, which may be delivered to the ACR-enabled smartTV 212 via the satellite network 208.

The encoding appliance 204 may comprise suitable logic, circuitry, interfaces and/or code that may be operable to encode a received feed into one or more encoded formats and accordingly generate one or more corresponding output encoded feeds. The encoding appliance 204 may be operable to receive an uncompressed (high definition) serial digital interface (HDSDI) protocol feed, which may comprise embedded metadata triggers that can include frame accurate declarations of advertisement and program time boundaries. The uncompressed (high definition) serial digital interface (HDSDI) protocol feed comprises a linear broadcast feed and as such, is a non-Internet Protocol (non-IP) feed or stream. In an exemplary embodiment of the disclosure, the serial digital interface (SDI/HDSDI) protocol feed may comprise a SCTE-104 SDI protocol feed. SCTE-104 is a standardized metadata insertion specification that may be utilized to declare digital insertion points of program and advertisement content in high definition (HD) SDI streams. The encoding appliance 204 may be operable to encode the received linear broadcast feed and generate an encoded compressed stream with content triggers translated from the broadcast SCTE-104 messages. In an exemplary embodiment of the disclosure, the encoding appliance 104 may be operable to encode the received linear broadcast feed and generate an MPEG-2 transport stream (TS) with SCTE-35 messages. The encoding appliance 204 may be substantially similar to the encoding appliance 104, which is shown and described with respect to FIG. 1.

The multiplexer and uplink system 206 may comprise suitable logic, circuitry, interfaces and/or code that may be operable to receive the encoded output feeds from the encoding appliance 204 and multiplex them into a multiplexed encoded feed for communication to the satellite network 208. In accordance with an embodiment of the disclosure, the multiplexer and uplink system 206 may comprise, for example, a satellite headend. It should be noted that in some embodiments of the disclosure, a content provider's live broadcast stream may be delivered directly via an IP based connection to the multichannel video programming distributor (MVPD), which is described with respect to, for example, FIG. 3, directly.

The satellite network 208 may comprise one or more satellites that may be operable to receive the multiplexed encoded feed from the multiplexer and uplink system 206 and broadcast the corresponding content via one or more downlink satellite channels. In this regard, the satellite network 208 may comprise suitable logic, circuitry, interfaces, devices and/or code that may be operable to receive the multiplexed encoded feed from the multiplexer and uplink system 206 and broadcast the corresponding content via one or more downlink satellite RF channels.

The demultiplexer and downlink system 210 may comprise suitable logic, circuitry, interfaces and/or code that may be operable to receive and demodulate the one or more downlink satellite RF channels comprising the multiplexed encoded feed. The output from the demultiplexer and downlink system 210 may be communicated to the ACR-enabled smartTV 212, which may be operable to tune to and decrypt the one or more downlink satellite RF channels. The output from the demultiplexer and downlink system 210 may also be communicated to the multichannel video programming distributor 248, which may be a radio frequency (RF), an intermediate frequency (IF), satellite, cable, and/or IP based distribution system. In this regard, the demultiplexer and downlink system 210 may be operable to communicate one or more corresponding demodulated downlink satellite RF channels to the multichannel video programming distributor 248, which may distribute and deliver live linear broadcast content, through the multichannel video programming distributor infrastructure 250, to the ACR-enabled smartTV 212 via the set-top box 252.

The ACR-enabled smartTV 212 may comprise suitable logic, circuitry, interfaces and/or code that may be operable to consume the live linear feed of the broadcast content from the DeMux/Downlink system 210 and/or Internet based multimedia content, which may be delivered via the satellite network 208. The ACR-enabled smartTV 212 may also be operable to consume live linear feed of the broadcast content from the set-top box 252, and/or Internet based multimedia content, which may be delivered via the IP network 246. The ACR-enabled smartTV 212 may be operable to handle automatic content recognition for the delivered broadcast content. The ACR-enabled smartTV 212 may be substantially similar to each of the ACR-enabled smartTVs 112, 114, 116, which are shown and described with respect to FIG. 1.

Each of the plurality of paired second screen communication devices 214, 216, 218 may comprise suitable logic, circuitry, interfaces and/or code that may be operable to handle the consumption of multimedia content. Each of the plurality of paired second screen communication devices 214, 216, 218 may comprise mobile communication devices and may be paired with the ACR-enabled smartTV 212. In this regard, each of the plurality of paired second screen communication devices 214, 216, 218, which may be paired with the ACR-enabled smartTV 212, may be operable to consume and interact with secondary content associated with the linear delivered broadcast content, which is being consumed by the ACR-enabled smartTV 212. The paired second screen communication devices 214, 216, 218 may be paired with the ACR-enabled smartTV 212. Each of the plurality of paired second screen communication devices 214, 216, 218 may be substantially similar to the paired second screen communication devices 116a, 116b, 116c, which are disclosed and described with respect to FIG. 1.

One or more of the plurality of paired second screen communication devices 214, 216, 218 may be operable to receive an indication that secondary content, which may be associated with the linear delivered broadcast content being consumed by the ACR-enabled smartTV 212, may be available for consumption by the paired second screen communication device. For example, one or more of the plurality of paired second screen communication devices such as the second screen communication device 214 may be operable to receive an indication or notification when secondary content associated with the linear delivered broadcast being consumed by the ACR-enabled smartTV 212, may be available for consumption by the second screen communication device 214.

Each of the plurality of paired second screen communication devices 214, 216, 218 may comprise an application (app), which is operable to handle the notification, communication and interaction with the secondary content that is associated with the linear delivered broadcast content being consumed by the ACR-enabled smartTV 212. In this regard, the paired second screen communication device 214 may comprise an application 214a, the paired second screen communication device 216 may comprise an application 216a and the paired second screen communication device 218 may comprise an application 218a. The applications 214a, 216a, 218a may be operable to receive a signal or message, which serves as an indication or notification that the secondary content associated with the delivered broadcast being consumed by the ACR-enabled smartTV 212 is available for presentation on the corresponding paired second screen communication devices 214, 216, 218. The applications 214a, 216a, 218a running on the paired second screen communication devices 214, 216, 218 may comprise an application, which runs on top of an operating system of the corresponding paired second screen communication devices 214, 216, 218 or an application which may be integrated as part of an operating system of the corresponding paired second screen communication devices 214, 216, 218. The applications 214a, 216a, 218a may run in the background or may be activated when the secondary content associated with the delivered broadcast being consumed by the ACR-enabled smartTV 212 is available. The applications 214a, 216a, 218a may comprise a user interface that may be operable to generate and/or display one or more control elements such as buttons, icons, visual aids and/or audio aids that enables interaction with the secondary content displayed the corresponding paired second screen communication devices 214, 216, 218.

The content provider/broadcaster 240 may be operable to generate content, which may be delivered to the ACR-enabled smartTV 212 via the IP network 246.

The encoding appliance 242 may comprise suitable logic, circuitry, interfaces and/or code that may be operable to encode a received feed into one or more encoded formats and accordingly generate one or more corresponding output encoded feeds. The encoding appliance 242 may be operable to receive an uncompressed (high definition) serial digital interface (HDSDI) protocol feed, which may comprise embedded metadata triggers that can include frame accurate declarations of advertisement and program time boundaries. The uncompressed (high definition) serial digital interface (HDSDI) protocol feed comprises a linear broadcast feed and as such, is a non-Internet Protocol (non-IP) feed or stream. In an exemplary embodiment of the disclosure, the serial digital interface (SDI/HDSDI) protocol feed may comprise a SCTE-104 SDI protocol feed. SCTE-104 is a standardized metadata insertion specification that may be utilized to declare digital insertion points of program and advertisement content in high definition (HD) SDI streams. The encoding appliance 204 may be operable to encode the received linear broadcast feed and generate an encoded compressed stream with content triggers translated from the broadcast SCTE-104 messages. In an exemplary embodiment of the disclosure, the encoding appliance 242 may be operable to encode the received linear broadcast feed and generate an MPEG-2 transport stream (TS) with SCTE-35 messages. The encoding appliance 242 may be substantially similar to the encoding appliance 104, which is shown and described with respect to FIG. 1.

The secure IP-based transmission equipment 244 may comprise suitable logic, interfaces, and/or code that may be operable to receive secure the generated MPEG-2 transport stream (TS) with SCTE-35 messages, which are received from the encoding appliance 242. In this regard, the secure IP-based transmission equipment 244 may be operable to encrypt the content from the encoding appliance 242, which comprises the MPEG-2 transport stream (TS) with SCTE-35 messages, so that it may be securely transported via the IP network 246.

The IP-network 246 may comprise suitable devices and/or interfaces that may be operable to receive content from the content provider/broadcaster 240 and communicate the received content to the multichannel video programming distributor 248. In this regard, the IP-network 246 may be operable to handle the communication of encrypted content, which may be received from the secure IP-based transmission equipment 244, to the multichannel video programming distributor 248.

The multichannel video programming distributor 248 may comprise suitable devices and/or interfaces that may be operable to deliver live linear content to the ACR-enabled smartTV 212 via the set-top box 252. The multichannel video programming distributor 248, may comprise a radio frequency (RF), an intermediate frequency (IF), satellite, cable, and/or IP based distribution system. The MVPD 248 may be operable to receive live linear content from the content provider/broadcaster 240 via the IP network 246. The MVPD 248 may also be operable to receive live linear content from the content provider/broadcaster 203 via the satellite network 208 and the DeMux/Downlink system 210. The MVPD 248 may comprise a MVPD infrastructure 250 and the set-top box (STB) 252.

The multichannel video programming distributor (MVPD) infrastructure 250 may comprise suitable devices and/or interfaces that may be operable to receive live linear content from the content providers/broadcasters 203, 240. In this regard, the MVPD infrastructure 250 may comprise, for example, satellite and/or cable equipment and infrastructure. The MVPD infrastructure 250 may receive live linear content from the satellite network 208 via the DeMux/Downlink system 210, and also from the IP network 246. The MVPD infrastructure 250 may be operable to communicate the received live linear content to the set-top box 252.

The set-top box (STB) 252 may comprise suitable logic, circuitry, interfaces and/or code that may be operable to receive linear content, which may be encrypted for secured, from the MVPD infrastructure 250. The set-top box (STB) 252 may be operable to tune to one or more channels and decrypt the live linear content. The decrypted live linear content may be communicated from the set-top box 252 to the ACR-enabled smartTV 212. The set-top box 252 may comprise a hardware set-top box or a virtual set-top box.

In operation, a viewer may be consuming linear broadcast content that is being delivered to and presented on the ACR-enabled smartTV 212 via the satellite network 208. An ACR event may be triggered during consumption and/or presentation of the linear delivered broadcast content in the ACR-enabled smartTV 212. The triggered ACR event may cause the generation of an invitation or notification on one or both of the paired second screen communication devices 214, 216, 218. The invitation or notification may indicate that corresponding secondary content associated with the delivered linear broadcast content being consumed by the ACR-enabled smartTVs 212 may be available for consumption by the one or more of the plurality of paired second screen communication devices 214, 216, 218. In an exemplary embodiment of the disclosure, the viewer may acknowledge the notification on the paired second screen communication device 214 in order to initiate consumption of the secondary content on the paired second screen communication device 214. The consumption of the delivered linear broadcast content by the ACR-enabled smartTVs 212 may be paused (as observed by the viewer) at about the time the viewer initiates consumption of the secondary content on the paired second screen communication device 214. The viewer may optionally defer consumption of the secondary content on the paired second screen communication device 214 until a subsequent time utilizing the application 214a.

In instances where the viewer has completed interacting with the secondary content on the paired second screen communication device 214, the viewer may resume consumption of the linear broadcast content on the ACR-enabled smartTV 212. The viewer may resume the consumption of the linear broadcast content on the ACR-enabled smartTV 212 to the current point of the linear broadcast. In this regard, the viewer misses out on the content that was presented in the linear broadcast content between the time at which the delivered linear broadcast content was paused on the ACR-enabled smartTV 212 and the time just before resuming consumption of the linear broadcast content on the ACR-enabled smartTV 212. In accordance with various embodiments of the disclosure, the viewer may resume the consumption of the linear broadcast content on the ACR-enabled smartTV 212 to the time at which the delivered linear broadcast content was paused on the ACR-enabled smartTV 212. In this regard the viewer does not miss out on any content that was presented in the linear broadcast content after the time at which the delivered linear broadcast content was paused on the ACR-enabled smartTV 212. The ACR-enabled smartTV 212 may be operable to switch from the linear broadcast content and consume content from a corresponding IP-based digital stream. Once the switch to the corresponding IP-based digital stream occurs, the ACR-enabled smartTV 212 presents the broadcast content from the corresponding time and position at which the delivered broadcast content in the linear feed was paused.

In accordance with some embodiments of the disclosure, two viewers may be operable to utilize corresponding versions or implementations of the paired second screen communication devices 214, 216 to concurrently consume the secondary content and may share the same viewer experience. In accordance with some embodiments of the disclosure, two viewers may be operable to utilize corresponding implementations or versions of the paired second screen communication devices 216, 218 to independently consume the secondary content and may have the same viewer experience or different viewer experiences.

In accordance with various embodiments of the disclosure, a second screen communication device such the second screen communication device 214 may be operable to launch an interactive application 214a in response to and/or based on an invitation cue or other type or notification presented by an ACR banner 152b (FIG. 2) displayed on an ACR-enabled smartTV 212 or a notification displayed on the second screen communication device 214. The second screen communication device 214 may be paired with the ACR-enabled smartTV 212. The invitation cue may be generated and presented by the ACR-enabled smartTV 212 while the ACR-enabled smartTV 212 may be displaying the linear broadcast content. The linear broadcast content may comprise, for example, a non-IP based broadcast content. The interactive application 214a, which may be launched on the second screen communication device 214, enables interaction with interactive content that is displayed by a user interface generated by the interactive application 214a on the second screen communication device 214 based on the invitation cue presented on the ACR-enabled smartTV 212. The ACR-enabled smartTV 212 is an example of an ACR-enabled display communication device, which may also be referred to as an ACR-enabled communication device.

One or more control elements that enable the interaction with the interactive content displayed by the user interface on the second screen communication device 214 may be generated by the ACR-enabled smartTV 212. The interaction with the interactive content may be controlled utilizing the generated one or more control elements. The generated one or more control elements may be utilized to resume display of an IP-based digital stream, which corresponds to the linear broadcast content, on the ACR-enabled smartTV 212. The second screen communication device 214 may be operable to control the interaction with the interactive content utilizing the generated one or more control elements in order to cause the interactive content displayed by the user interface on the second screen communication device 214 to be concurrently displayed on the ACR-enabled smartTV 212. The second screen communication device 214 may be operable to interact with additional interactive content, which may be displayed by the user interface on the second screen communication device 214 and is associated with the invitation cue, subsequent to resuming the displaying of the corresponding IP-based digital stream on the ACR-enabled smartTV 212.

The second screen communication device 214 is operable to receive a notification that indicates that the interactive content is available for display by the user interface on the second screen communication device 214. If the interactive application 314a is not installed on the second screen communication device 214 prior to the launching, the second screen communication device 214 may be operable to download and/or install the interactive application 214a on the second screen communication device 214. Once downloaded, the interactive application may be launched by the second screen communication device 214. Interaction with the interactive content utilizing the generated one or more control elements may be deferred utilizing the generated one or more control elements. In accordance with an embodiment of the disclosure, the invitation cue may be generated based on an advertisement or other item within the linear broadcast content that is displayed by the ACR-enabled smartTV 212. The interactive content displayed on the second screen device 314 may comprise subject matter that is representative of the advertisement. The invitation cue may comprise a visual and/or an audio cue. In an exemplary embodiment of the disclosure, the second screen communication device 214 may comprise a smart phone and a tablet and the ACR-enabled display communication device may comprise an automatic content recognition enabled smart television.

Figure 4:
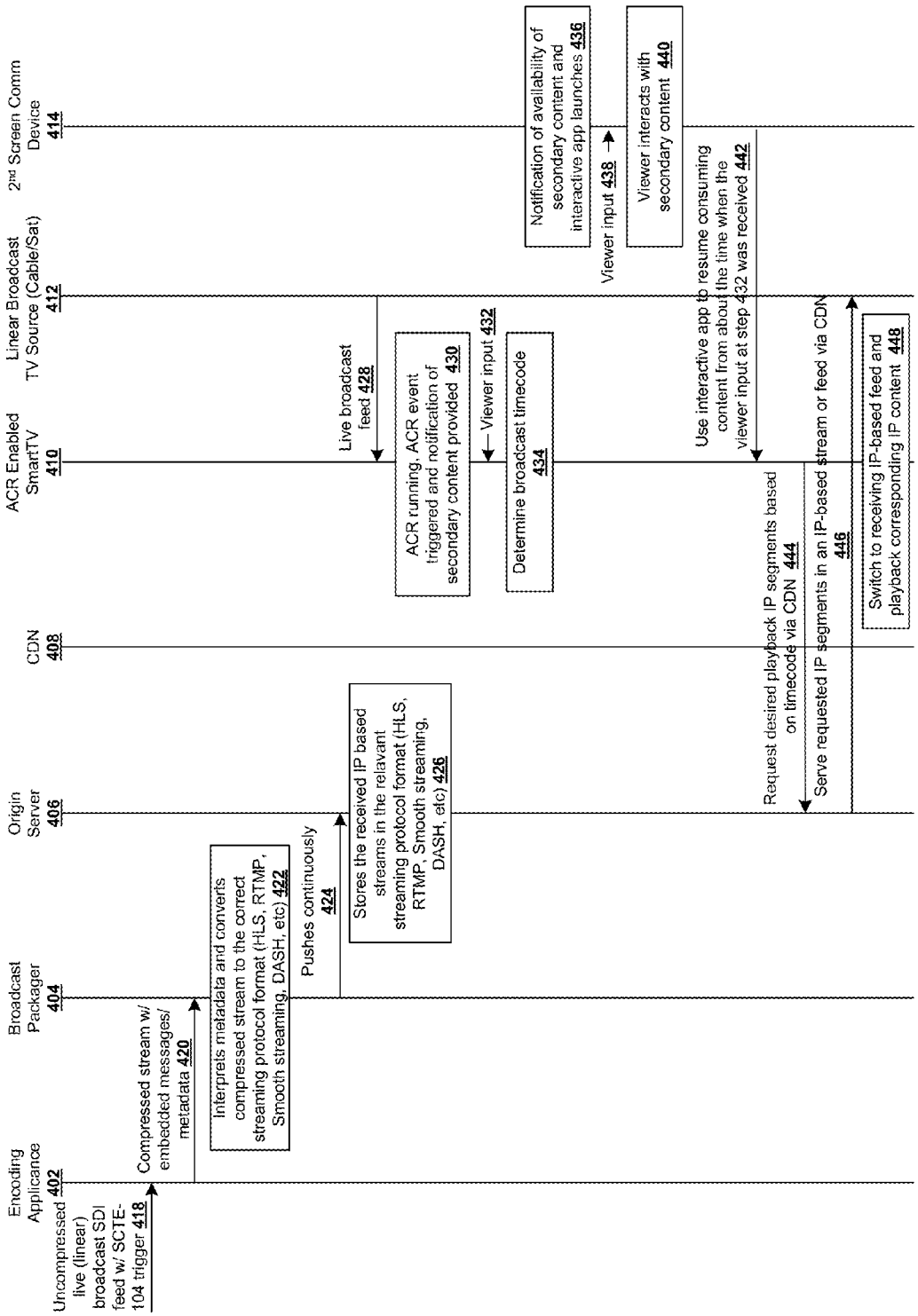
FIG. 4 is a flow diagram that illustrates communication in an exemplary system for automatic content recognition integration for smartTVs and mobile communication devices, in accordance with an exemplary embodiment of the disclosure.

FIG. 4 is a flow diagram that illustrates communication in an exemplary system for automatic content recognition integration for smartTVs and mobile communication devices, in accordance with an exemplary embodiment of the disclosure. Referring to FIG. 4, there is shown a flow diagram 400 comprising an encoding appliance 402, a broadcast packager 404, an origin server 406, a content delivery network 408, an ACR-enabled smartTV 410, a linear broadcast TV source 412, and a second screen communication device 414. FIG. 4 also illustrates a plurality of exemplary steps comprising steps 418 though 448.

In step 418, an uncompressed live broadcast SDI feed w/SCTE-104 trigger is received by the encoding appliance 402. In step 420, the encoding appliance 402 generates an output compressed stream with embedded messages and metadata. In step 422, the broadcast packager 404 interprets the metadata and converts the compressed stream with the embedded messages and metadata to the correct streaming protocol format, for example, HLS, RTMP, Smooth streaming, DASH, and so on. In step 424, the broadcast packager 404 continuously pushes the corresponding output stream to the origin server 406. In step 426, the origin server 406 stores the received IP based streams in the relevant streaming protocol format (HLS, RTMP, Smooth streaming, DASH, etc.).

In step 428, a live broadcast feed may be received by the ACR-enabled smartTV 410 from the linear broadcast TV source 412. At 430, the ACR-enabled smartTV 410, which has ACR running, has an ACR triggered event and a notification is provided. The notification provides an indication that secondary content is available for consumption on the second screen communication device 414. In step 432, the viewer may acknowledge the notification from step 430. In step 434, the ACR-enabled smartTV 410 may be operable to determine a broadcast timecode that is associated with the content being consumed on the ACR-enabled TV at about the time when the viewer input in step 432 occurred.

In step 436, the second screen communication device 414 may be operable to generate a notification of availability of secondary content and launches an interactive application. The interactive application enables the viewer to interact with the secondary content on the second screen device. In step 438, the second screen communication device 414 may receive viewer input, which may acknowledge that the viewer is ready to interact with the secondary content on the second screen communication device 414.

In step 440, the viewer interacts with the secondary content on the second screen communication device 414. In this regard, the viewer may utilize, for example, one or more controls on the interactive application to control interaction with the secondary content. The viewer may also utilize the one or more controls to share portions of the secondary content and/or viewer experience with one or more people such as friends and/or family members. In this regard, the viewer may share the portions of the secondary content and/or viewer experience with one or more people via social media and/or the Internet, via, for example, postings, blogs, chat, and so on. In step 442, the interactive application may be utilized to resume consuming content from about the time when the viewer input at step 432 was received. At step 444, the ACR-enabled smartTV 410 may be operable to request desired playback IP-based segment based on the determined timecode via the content delivery network 408. In this regard, the ACR-enabled smartTV 410 sends the request to the origin server 406, via the content delivery network 408, requesting that the origin server 406 provide the ACR-enabled smartTV 410 with the playback IP segments starting from the point identified by the determined timecode. In step 446, the origin server is operable to serve the requested IP segments in an IP-based stream or feed, via the content delivery network 408, to the ACR-enabled smartTV 410. In step 448, the ACR-enabled smartTV 410 may switch to receiving the IP-based stream or feed and playback the corresponding IP content in the IP-based stream or feed.

Figure 5:
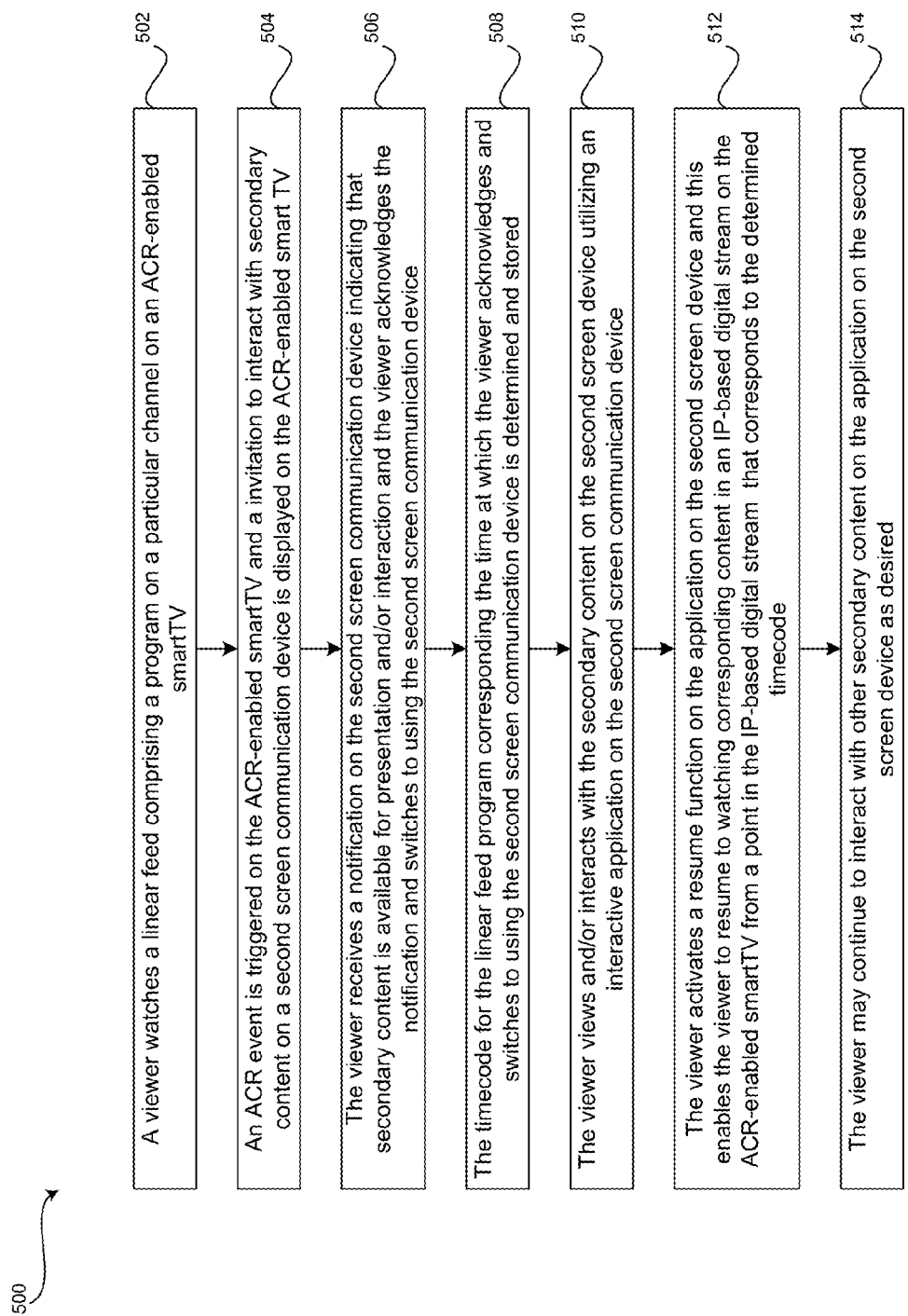
FIG. 5 is a flow diagram that illustrates exemplary steps for viewer interaction in a system for automatic content recognition integration for smartTVs and mobile communication devices, in accordance with an exemplary embodiment of the disclosure.

FIG. 5 is a flow diagram that illustrates exemplary steps for viewer interaction in a system for automatic content recognition integration for smartTVs and mobile communication devices, in accordance with an exemplary embodiment of the disclosure. Referring to FIG. 5, there is shown a flowchart 500 comprising a plurality of steps 502 through 514. In step 502, a viewer watches a linear feed comprising a program on a particular channel on an ACR-enabled smartTV. In step 504, an ACR event is triggered on the ACR-enabled smartTV and a invitation to interact with secondary content on a second screen communication device is displayed on the ACR-enabled smart TV. In step 506, the viewer may receive a notification on the second screen communication device indicating that secondary content is available for presentation and/or interaction and the viewer acknowledges the notification and switches to using the second screen communication device.

In step 508, the timecode for the linear feed program corresponding the time at which the viewer acknowledges and switches to using the second screen communication device is determined and/or stored. In step 510, the viewer views and/or interacts with the secondary content on the second screen communication device utilizing an interactive application on the second screen communication device. In step 512, the viewer activates a resume function on the application on the second screen communication device and this enables the viewer to resume watching corresponding content in an IP-based digital stream on the ACR-enabled smartTV from a point in the IP-based digital stream that corresponds to the determined timecode. The IP-based digital stream may be delivered to the ACR-enabled smartTV via the content delivery network 110, which is illustrated in and described with respect to FIG. 1. In step 514, the viewer may subsequently continue to interact with other secondary content on the application on the second screen communication device as desired.

Figure 6:
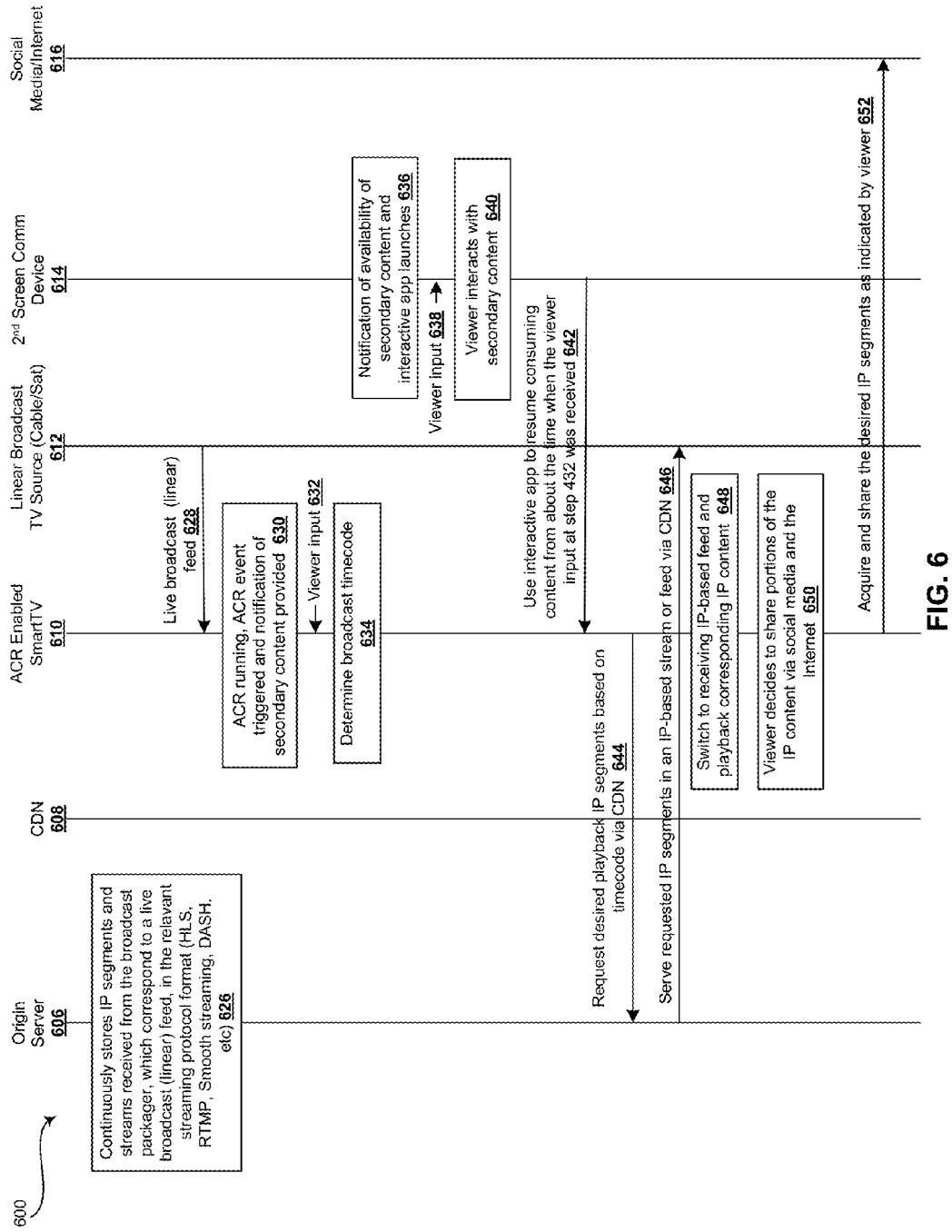
FIG. 6 is a flow diagram that illustrates communication and sharing of content in an exemplary system for automatic content recognition integration for smartTVs and mobile communication devices, in accordance with an exemplary embodiment of the disclosure.

FIG. 6 is a flow diagram that illustrates communication and sharing of content in an exemplary system for automatic content recognition integration for smartTVs and mobile communication devices, in accordance with an exemplary embodiment of the disclosure. Referring to FIG. 6, there is shown a flow diagram 600 comprising an origin server 606, a content delivery network 608, an ACR-enabled smartTV 610, a linear broadcast TV source 612, a second screen communication device 614 and a social media and the Internet entity 616. FIG. 6 also illustrates a plurality of exemplary steps comprising steps 626 though 652. Although not shown in FIG. 6, the operations of the encoding appliance 402 and the broadcast packager 404, which are illustrated and described with respect to FIG. 4, and which precede the operation of the origin server 606, may also be applicable to FIG. 6.

In step 626, the origin server 606 continuously stores the IP segments and streams received from the broadcast packager, which correspond to a live broadcast (linear) feed, in the relevant streaming protocol format (HLS, RTMP, Smooth streaming, DASH, etc.). The live broadcast feed may be received from the linear broadcast TV source (cable and/or satellite) 612. In step 628, a live broadcast feed may be received by the ACR-enabled smartTV 610 from the linear broadcast TV source (cable and/or satellite) 612. At 630, the ACR-enabled smartTV 610, which has ACR running, has an ACR triggered event and a notification is provided. The notification provides an indication that secondary content is available for consumption on the second screen communication device 614. In step 632, the viewer may acknowledge the notification from step 630. In step 634, the ACR-enabled smartTV 610 may be operable to determine a broadcast timecode that is associated with the content being consumed on the ACR-enabled TV at about the time when the viewer input in step 632 occurred.

In step 636, the second screen communication device 614 may be operable to generate a notification of availability of secondary content and launches an interactive application. The interactive application enables the viewer to interact with the secondary content on the second screen device 614. In step 638, the second screen communication device 614 may receive viewer input, which may acknowledge that the viewer is ready to interact with the secondary content on the second screen communication device 614. In step 640, the viewer interacts with the secondary content 640 on the second screen communication device 614. In step 642, the interactive application may be utilized to resume consuming content from about the time when the viewer input at step 632 was received. At step 644, the ACR-enabled smartTV 610 may be operable to request desired playback IP-based segment based on the determined timecode via the content delivery network 608. In this regard, the ACR-enabled smartTV 610 sends the request to the origin server 606, via the content delivery network 608, requesting that the origin server 606 provide the ACR-enabled smartTV 610 with the playback IP segments starting from the point identified by the determined timecode. In step 646, the origin server is operable to serve the requested IP segments in an IP-based stream or feed, via the content delivery network 608, to the ACR-enabled smartTV 610.

In step 648, the ACR-enabled smartTV 610 may switch to receiving the IP-based stream or feed and playback the corresponding IP content in the IP-based stream or feed. In step 650, the viewer may decide to share portions of the IP content via social media and/or the Internet 616. The ACR-enabled smartTV 610 may be operable to store one or more accounts and/or profiles that enables the viewer to identify, log into and/or otherwise share the portions of the IP content via the social media and/or the Internet 616. In this regard, the viewer may share the portions of the IP content via, for example, postings, blogs, chat, and so on.

Figure 7:
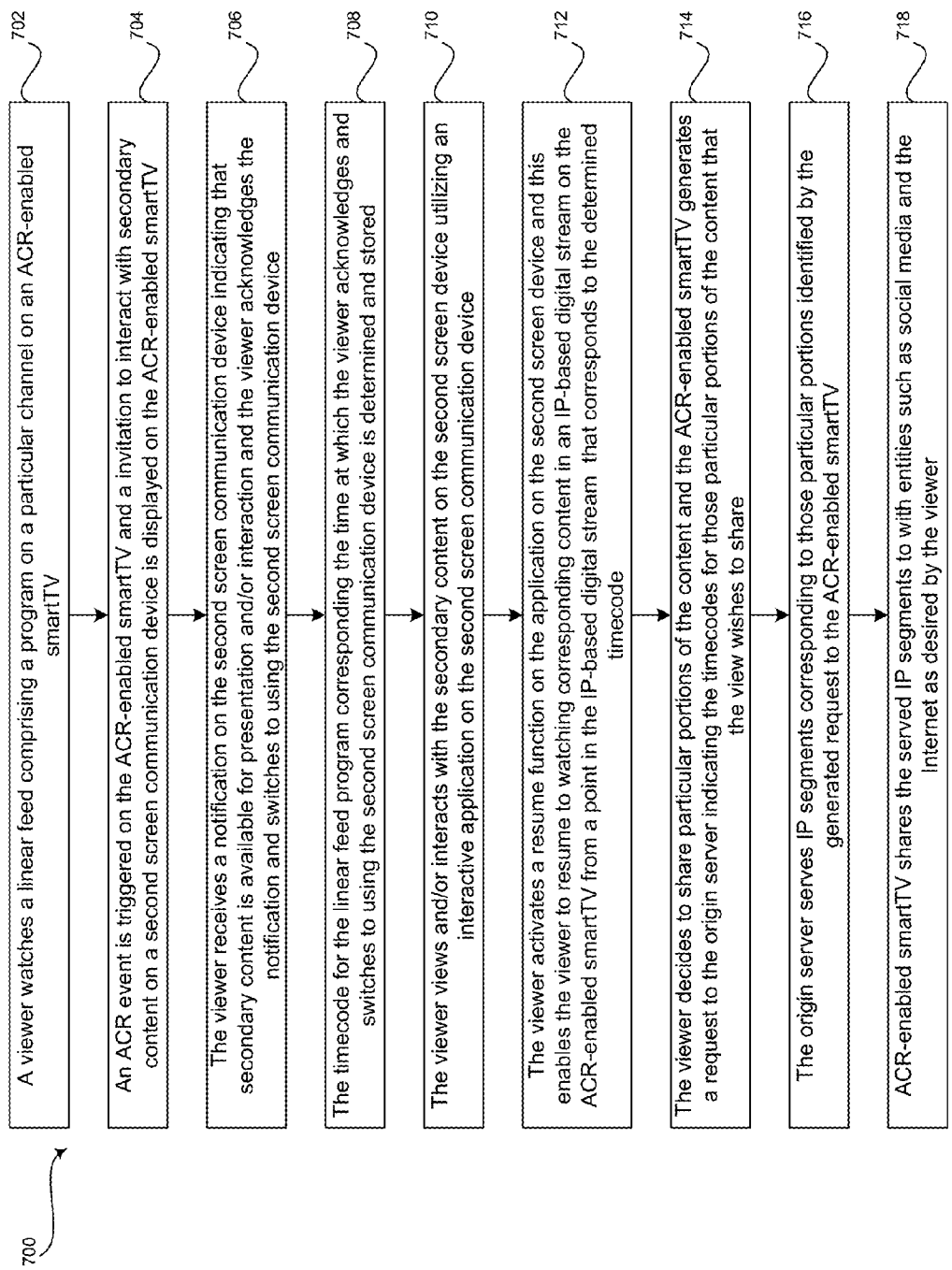
FIG. 7 is a flow diagram that illustrates exemplary steps for viewer interaction in a system for automatic content recognition integration for smartTV and mobile communication devices, in accordance with an exemplary embodiment of the disclosure.

FIG. 7 is a flow diagram that illustrates exemplary steps for viewer interaction in a system for automatic content recognition integration for smartTVs and mobile communication devices, in accordance with an exemplary embodiment of the disclosure. Referring to FIG. 7, there is shown a flowchart 700 comprising a plurality of steps 702 through 718. In step 702, a viewer watches a linear feed comprising a program on a particular channel on an ACR-enabled smartTV. In step 704, an ACR event is triggered on the ACR-enabled smartTV and a invitation to interact with secondary content on a second screen communication device is displayed on the ACR-enabled smart TV. In step 706, the viewer may receive a notification on the second screen communication device indicating that secondary content is available for presentation and/or interaction and the viewer acknowledges the notification and switches to using the second screen communication device.

In step 708, the timecode for the linear feed program corresponding the time at which the viewer acknowledges and switches to using the second screen communication device is determined and/or stored. In step 710, the viewer views and/or interacts with the secondary content on the second screen communication device utilizing an interactive application on the second screen communication device. In step 712, the viewer activates a resume function on the application on the second screen communication device and this enables the viewer to resume watching corresponding content in an IP-based digital stream on the ACR-enabled smartTV from a point in the IP-based digital stream that corresponds to the determined timecode. The IP-based digital stream may be delivered to the ACR-enabled smartTV via the content delivery network 110, which is illustrated in and described with respect to FIG. 1.

Figure 8:
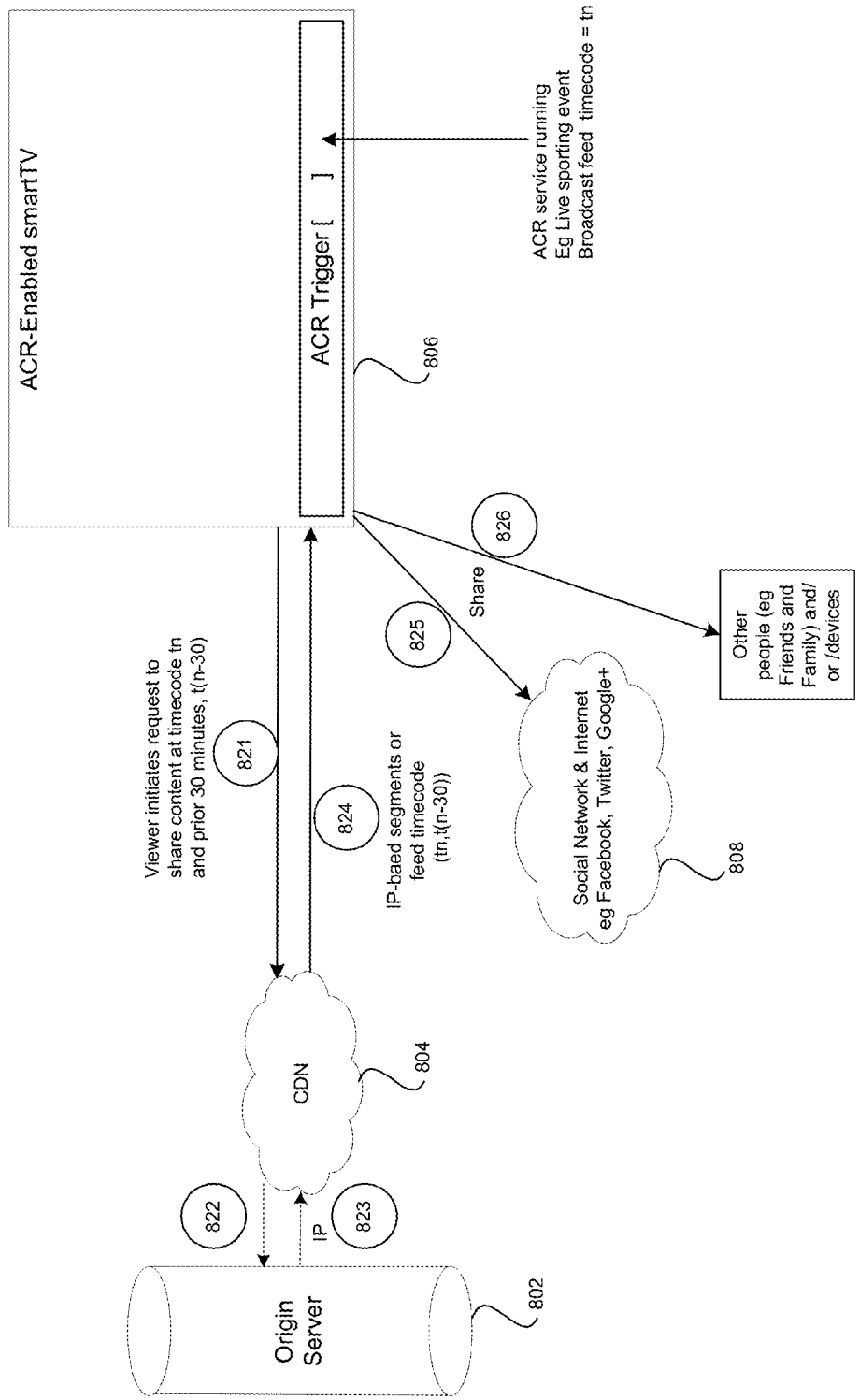
FIG. 8 is a flow diagram that illustrates communication and sharing of content in an exemplary system for automatic content recognition integration for smartTVs and mobile communication devices, in accordance with an exemplary embodiment of the disclosure.

In step 714, the viewer may decide to share particular portions of the content and the ACR-enabled smartTV generates a request to the origin server indicating the timecodes for those particular portions of the content that the view wishes to share. In this regard, in an exemplary embodiment of the disclosure, the request may comprise a starting time code and an ending timecode that identifies one or more contiguous or non-contiguous blocks of IP segments that will be shared. In another exemplary embodiment of the disclosure, the request may specify a starting timecode and a time that specifies how long the particular portion should be. For example, the request may specify IP segments starting at timecode ta succeeding the next 15 seconds of content, or timecode ta plus the preceding 15 seconds of content. In step 716, the origin server serves IP segments corresponding to those particular portions identified by the generated request to the ACR-enabled smartTV. In step 718, the ACR-enabled smartTV shares the served IP segments with entities such as social media and the Internet as desired by the viewer FIG. 8 is a flow diagram that illustrates communication and sharing of content in an exemplary system for automatic content recognition integration for smartTVs and mobile communication devices, in accordance with an exemplary embodiment of the disclosure. Referring to FIG. 8, there is shown and origin server 802, a content delivery network 804, and ACR-enabled smartTV 806 and a social network and the Internet 808.

At 821, a viewer of the ACR-enabled smartTV 806 may initiate a request to share content at timecode to and prior 30 minutes, t(n−30). At 822, the request is communicated from the ACR-enabled smartTV 806 to the origin server 802 via the content delivery network 804. At 823, the origin server 802 extracts the IP segments or feed for the content corresponding timecode tn and prior 30 minutes, t(n−30), namely, (tn, t(n−30)). At 824, the IP-based segments or feed corresponding to timecode (tn,t(n−30)) may be communicated from the origin server 803 to the ACR-enabled smartTV 806 via the content delivery network 804. At 825, the ACR-enabled smartTV 806 may be operable to share the content for the IP-based segments or feed corresponding to timecode (tn,t(n−30)) with the social network and/or Internet 808. At 825, the ACR-enabled smartTV 806 may be operable to share the content for the IP-based segments or feed corresponding to timecode (tn, t(n−30)) with other people such as friends, coworkers, meeting participants and family, and/or with other devices.

In accordance with an embodiment of the disclosure, in instances when a program is started or restarted, the ACR-enabled smartTV 806 may be operable to utilize automatic content recognition to identify or detect when the program is in progress. In this regard, the ACR-enabled smartTV 806 may be operable to utilize automatic content recognition to trigger an overlay that enables the viewer to start over. Upon selection by the viewer of the ACR-enabled smartTV 806, the ACR-enabled smartTV 806 may be operable to switch from the broadcast feed to an IP-based stream from the program start.

In accordance with an embodiment of the disclosure, in instances when a program is started or restarted based on a network schedule, automatic content recognition may be utilized to identify the network. Automatic content recognition running on the ACR-enabled smartTV 806 may be operable to utilize automatic content recognition to trigger a network schedule overlay. In this regard, the viewer of the ACR-enabled smartTV 806 may go back in time to a previous program or show in the schedule. Instead of showing low rating content during daytime, content with higher ratings may be presented to drive up or increase viewer traffic. If a viewer's viewing pattern and/or profile indicates that the viewer has never watched a basketball game, then the view may not be presented with a basketball game but instead may be presented with alternate content. The schedule may be tailored based on, for example, time-of-day, or other events, preferences, viewing patterns, and/or other criteria.

In accordance with various exemplary embodiments of the disclosure, an ACR-enabled display communication device such as the ACR-enabled smartTV 806 is operable to receive and consume content from a linear feed and a corresponding Internet Protocol (IP) based feed. The linear feed and the IP-based feed may comprise one or more content identifiers that identify similar content within the linear feed and the IP-based feed and may also include one or more corresponding automatic content recognition triggers. The ACR-enabled display communication device (e.g., ACR-enabled smartTV 806) is operable to determine a first content identifier that is associated with a first content in the linear feed that is being consumed by the ACR-enabled display communication device (e.g., ACR-enabled smartTV 806). The ACR-enabled display communication device (e.g., ACR-enabled smartTV 806) is operable to request IP segments in the IP-based feed that corresponds to the determined first content identifier and switch from consuming content in the linear feed to consuming content in the requested IP segments. The ACR-enabled display communication device (e.g., ACR-enabled smartTV 806) is operable to store the determined first content identifier. The ACR-enabled display communication device (e.g., ACR-enabled smartTV 806) is operable to receive the requested IP segments from a remote server.

The ACR-enabled display communication device (e.g., ACR-enabled smartTV 806) may also be operable to determine the first content identifier in response to a demand to initiate consumption from the IP-based feed. In some embodiments of the disclosure, the demand may occur after completion of consumption of secondary content on a second screen communication device and there is a need to resume consumption of content from a point corresponding to the first content identifier. In some embodiments of the disclosure, the demand may occur when a request to share content being consumed is initiated. The switch from consuming content in the linear feed to consuming content in the requested IP segments is transparent to a viewer of the ACR-enabled display communication device (e.g., ACR-enabled smartTV 806). The ACR-enabled display communication device (e.g., ACR-enabled smartTV 806) may also be operable to share one or more portions of the consumed content in the requested IP segments. The one or more portions of the consumed content in the requested IP segments may be shared via one or more social networking postings. The ACR-enabled display communication device (e.g., ACR-enabled smartTV 806) may be operable to acquire from one or more profiles and/or preferences, information that may be utilized for handling the one or more social networking postings.

As utilized herein the terms "circuits" and "circuitry" refer to physical electronic components (i.e., hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

Other embodiments of the disclosure may provide a computer readable device and/or a non-transitory computer readable medium, and/or a machine readable device and/or a non-transitory machine readable medium, having stored thereon, a machine code and/or a computer program having at least one code section executable by a machine and/or a computer, thereby causing the machine and/or computer to perform the steps as described herein for controlling and interacting with advertisements.

Accordingly, the present disclosure may be realized in hardware, software, or a combination of hardware and software. The present disclosure may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method, comprising:
in an automatic content recognition enabled display communication device that is operable to receive a broadcast and a corresponding IP-based feed having same content as said broadcast, wherein:
said broadcast and said IP-based feed comprise one or more content identifiers that identify similar content within said broadcast and said IP-based feed; and
said broadcast and said IP-based feed comprise one or more corresponding automatic content recognition triggers:
determining, based on a demand to initiate consumption from said IP-based feed, a first content identifier that is associated with a first content in said broadcast that is being consumed by said automatic content recognition enabled display communication device, wherein said demand occurs when a request to share with one or more viewers, one or more segments of content being consumed via said broadcast is initiated by a viewer of the automatic content recognition enabled display communication device;
requesting IP segments in said IP-based feed that corresponds to said determined first content identifier; and
switching from consuming content in said broadcast to consuming content in said requested IP segments.

2. The method according to claim 1, comprising storing said determined first content identifier.

3. The method according to claim 1, comprising receiving said requested IP segments from a remote server.

4. The method according to claim 1, wherein:
said demand occurs after completion of consumption of secondary content on a second screen communication device and there is a need to resume consumption of content from a point corresponding to said first content identifier; and
said secondary content is different from content from said IP-based feed.

5. The method according to claim 1, wherein said switching from consuming content in said broadcast to consuming content in said requested IP segments is transparent to a viewer of said automatic content recognition enabled display communication device.

6. The method according to claim 1, comprising sharing one or more portions of said consumed content in said requested IP segments.

7. The method according to claim 6, wherein said one or more portions of said consumed content in said requested IP segments is shared via one or more social networking postings.

8. The method according to claim 6, wherein said one or more portions of said consumed content in said requested IP segments is shared with users of one or more other devices.

9. The method according to claim 6, wherein said one or more portions of said consumed content in said requested IP segments is shared with one or more meeting participants.

10. The method according to claim 7, comprising acquiring from one or more profiles and/or preferences, information utilized for handling said one or more social networking postings.

11. A system, comprising:
an automatic content recognition enabled display communication device that is operable to receive broadcast and a corresponding IP-based feed having same content as said broadcast, wherein:
said broadcast and said IP-based feed comprise one or more content identifiers that identify similar content within said broadcast and said IP-based feed;
said broadcast and said IP-based feed comprise one or more corresponding automatic content recognition triggers; and
said automatic content recognition enabled display communication device is operable to:
determine, based on a demand to initiate consumption from said IP-based feed, a first content identifier that is associated with a first content in said broadcast that is being consumed by said automatic content recognition enabled display communication device, wherein said demand occurs when a request to share with one or more viewers, one or more segments of content being consumed via said broadcast is initiated by a viewer of the automatic content recognition enabled display communication device;
request IP segments in said IP-based feed that corresponds to said determined first content identifier; and
switch from consuming content in said broadcast to consuming content in said requested IP segments.

12. The system according to claim 11, wherein said automatic content recognition enabled display communication device is operable to store said determined first content identifier.

13. The system according to claim 11, wherein said automatic content recognition enabled display communication device is operable to receive said requested IP segments from a remote server.

14. The system according to claim 11, wherein:
said demand occurs after completion of consumption of secondary content on a second screen communication device and there is a need to resume consumption of content from a point corresponding to said first content identifier; and
said secondary content is different from content from said IP-based feed.

15. The system according to claim 11, wherein said switch from consuming content in said broadcast to consuming content in said requested IP segments is transparent to a viewer of said automatic content recognition enabled display communication device.

16. The system according to claim 11, wherein said automatic content recognition enabled display communication device is operable to share one or more portions of said consumed content in said requested IP segments.

17. The system according to claim 16, wherein said one or more portions of said consumed content in said requested IP segments is shared via one or more social networking postings.

18. The system according to claim 16, wherein said one or more portions of said consumed content in said requested IP segments is shared with users of one or more other devices.

19. The system according to claim 16, wherein said one or more portions of said consumed content in said requested IP segments is shared with one or more meeting participants.

20. The system according to claim 17, wherein said automatic content recognition enabled display communication device is operable to acquire from one or more profiles and/or preferences, information utilized for handling said one or more social networking postings.

21. A non-transitory computer-readable medium for an automatic content recognition enabled display communication device that is operable to receive broadcast and a corresponding IP-based feed having same content as said broadcast, wherein:
said broadcast and said IP-based feed comprise one or more content identifiers that identify similar content within said broadcast and said IP-based feed;
said broadcast and said IP-based feed comprise one or more corresponding automatic content recognition triggers; and
said automatic content recognition enabled display communication device comprising code that:
determines, based on a demand to initiate consumption from said IP-based feed, a first content identifier that is associated with a first content in said broadcast that is being consumed by said automatic content recognition enabled display communication device, wherein said demand occurs when a request to share with one or more viewers, one or more segments of content being consumed via said broadcast is initiated by a viewer of the automatic content recognition enabled display communication device;
request IP segments in said IP-based feed that corresponds to said determined first content identifier; and
switch from consuming content in said broadcast to consuming content in said requested IP segments.

22. The non-transitory computer-readable medium according to claim 21, wherein said automatic content recognition enabled display communication device is operable to store said determined first content identifier.

23. The non-transitory computer-readable medium according to claim 21, wherein said automatic content recognition enabled display communication device is operable to receive said requested IP segments from a remote server.

24. The non-transitory computer-readable medium according to claim 21, wherein:
said demand occurs after completion of consumption of secondary content on a second screen communication device and there is a need to resume consumption of content from a point corresponding to said first content identifier; and said secondary content is different from content from said IP-based feed.

25. The non-transitory computer-readable medium according to claim 21, wherein said switch from consuming content in said broadcast to consuming content in said requested IP segments is transparent to a viewer of said automatic content recognition enabled display communication device.

26. The non-transitory computer-readable medium according to claim 21, wherein said automatic content recognition enabled display communication device is operable to share one or more portions of said consumed content in said requested IP segments.

27. The non-transitory computer-readable medium according to claim 26, wherein said one or more portions of said consumed content in said requested IP segments is shared via one or more social networking postings.

28. The non-transitory computer-readable medium according to claim 26, wherein said one or more portions of said consumed content in said requested IP segments is shared with users of one or more other devices.

29. The non-transitory computer-readable medium according to claim 26, wherein said one or more portions of said consumed content in said requested IP segments is shared with one or more meeting participants.

30. The non-transitory computer-readable medium according to claim 27, wherein said automatic content recognition enabled display communication device is operable to acquire from one or more profiles and/or preferences, information utilized for handling said one or more social networking postings.

* * * * *